March 11, 1958 — R. R. STEWARD, JR — 2,826,733
ELECTRICAL APPARATUS
Filed March 16, 1954 — 3 Sheets-Sheet 1

*INVENTOR.*
ROBERT R. STEWARD JR.
BY Arthur H. Swanson
ATTORNEY.

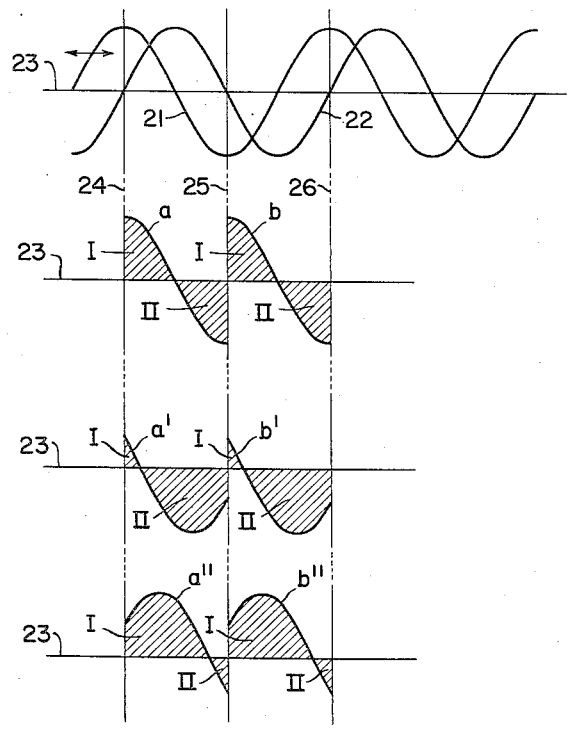
FIG. 3
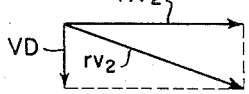
FIG. 3a
RV
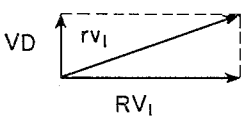
FIG. 3b
FIG. 3c
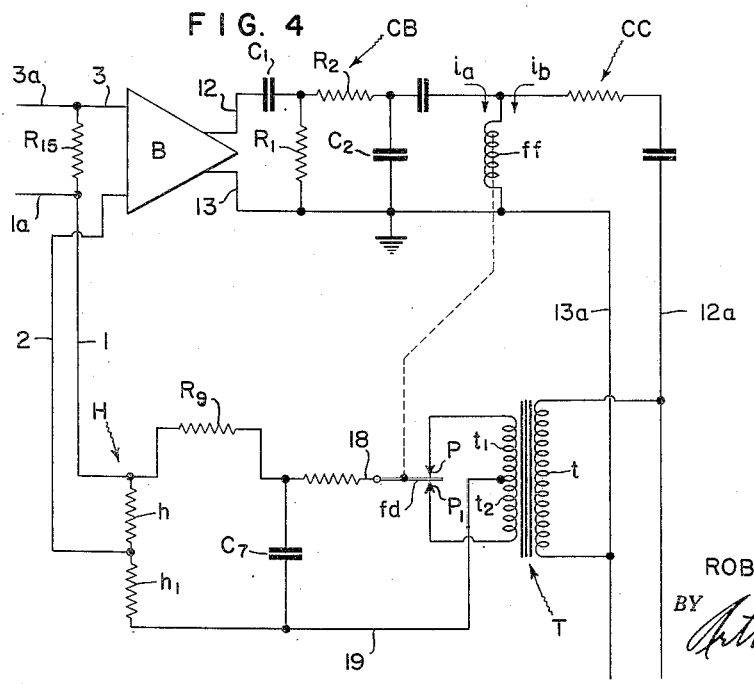
FIG. 4
*INVENTOR.*
ROBERT R. STEWARD JR.
BY Arthur H. Swanson
ATTORNEY.

March 11, 1958 R. R. STEWARD, JR 2,826,733
ELECTRICAL APPARATUS

Filed March 16, 1954 3 Sheets-Sheet 3

*INVENTOR.*
ROBERT R. STEWARD JR.
BY *Arthur H. Swanson*
ATTORNEY.

United States Patent Office 2,826,733
Patented Mar. 11, 1958

2,826,733

ELECTRICAL APPARATUS

Robert R. Steward, Jr., Milford, Del., assignor to Minneapolis-Honeywell Regulator Company, Minneapolis, Minn., a corporation of Delaware Application March 16, 1954, Serial No. 419,035

20 Claims. (Cl. 321—48)

The general object of the present invention is to provide an improved self-balancing instrument usable for the general purposes of the self-balancing instrument disclosed in the Wills Patent 2,423,540 of July 8, 1947, and in wide and successful commercial use. The improved instrument differs from said Wills patent instrument in various important respects, and notably in the omission of the reversible motor and rebalancing slide wire which are characteristic features of the Wills patent instrument. Another important difference between the present instrument and the Wills patent instrument results from the manner in which the amplified output voltage of the converter is utilized for control and balancing purposes. In accordance with the present invention, the output amplified voltage is used to produce a D. C. signal which varies proportionally with the amplified A. C. signal in phase and amplitude and which signal may be used for control purposes and/or rebalancing the input of the instrument.

In a preferred form of the present invention, said D. C. output is fed back to and proportionally reduces the magnitude of the initial control signal, but said D. C. output may be used for other purposes illustrated and described hereinafter.

More specific objects of the present invention are to provide an electrical instrument having one or more of the following specific advantages over similar prior art types of instruments. One of those advantages is a substantial reduction in the required vacuum tube amplifier power, which is made possible by the use of an output chopper as a power amplifier which requires only a relatively small driving power. Another of said advantages is the freedom of my new instrument from high frequency oscillations, which is made possible by the fact that the instrument feedback loop is closed only by means of a mechanical link which is an ideal low pass device. The new instrument is inherently less expensive than instruments of known prior art type, and the operation of the output chopper of the new instrument is inherently much faster than is possible of attainment with the reversible motor and slide wire drives of some of the prior art types of instruments.

The present invention is advantageously characterized by its inclusion of various features like or analogous to those disclosed in patents prior to said Wills patent, such as the Eberhardt et al. Patent 2,297,543 of September 29, 1942, and the Vance Patent 2,190,743 of February 20, 1940. It is noted, however, that in each of the two patents last mentioned, use is made of an electrical circuit loop connecting the output of an output amplifier to the input of an input amplifier. As previously noted, no such feedback loop is used in the present invention, nor is it used in said Wills patent. The present invention makes use of an output chopper energized jointly by said output amplifier and by an A. C. supply current source with the chopper output signal being derived from a separate power source having a power handling capacity greater than may be readily achieved in an amplifier of useful commercial application.

The various features of novelty which characterize the invention are pointed out with particularity in the claims annexed to and forming a part of this specification. For a better understanding of the invention, however, its advantages, and specific objects attained with its use, reference should be had to the accompanying drawings and descriptive matter in which there has been illustrated and described preferred embodiments of the invention.

Of the drawings:

Fig. 1 diagrammatically illustrates one form of the present invention;

Fig. 3 is a graphical representation illustrating varying circuit conditions developing in the normal use of the apparatus shown in Fig. 1;

Figs. 3a, 3b and 3c illustrate the effects of different signal errors shown in Fig. 3;

Figure 1:
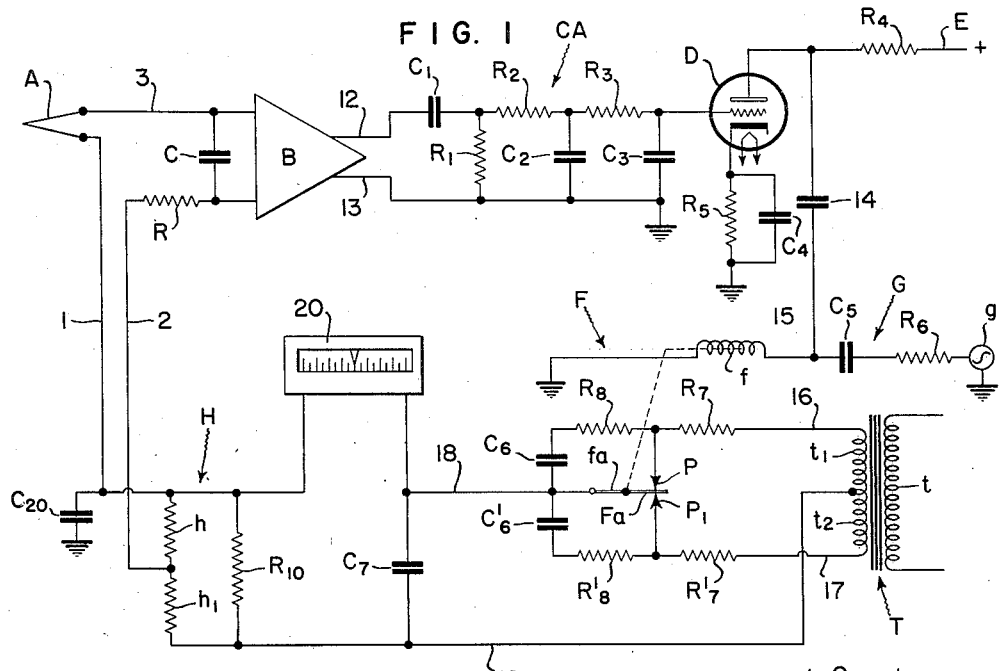
Figure 5:
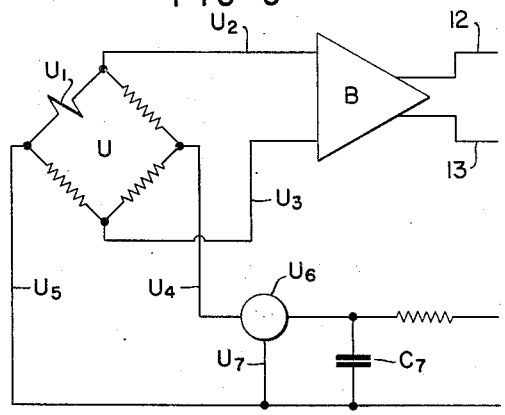
Figure 6:
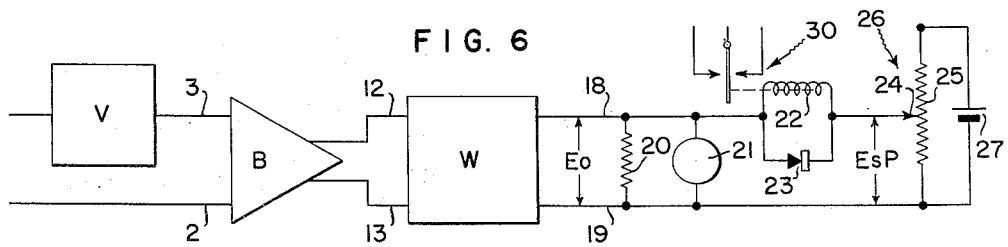
Figure 7:
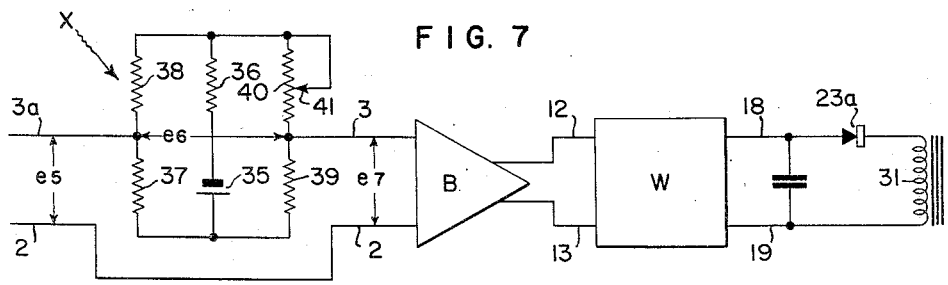

Fig. 4 diagrammatically illustrates a modification of the apparatus shown in Fig. 1;

Fig. 5 illustrates a further modification of a portion of the apparatus shown in Fig. 1;

Fig. 6 is a second modification of the apparatus shown in Fig. 1;

Fig. 7 is a third modification of the apparatus shown in Fig. 1; and

Figure 7A:
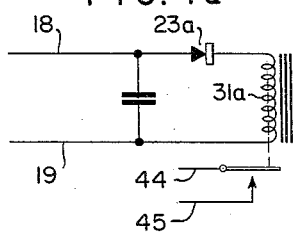

Fig. 7a is a diagram illustrating how a modified output control action is obtainable with the apparatus shown in Fig. 7.

Figure 2:
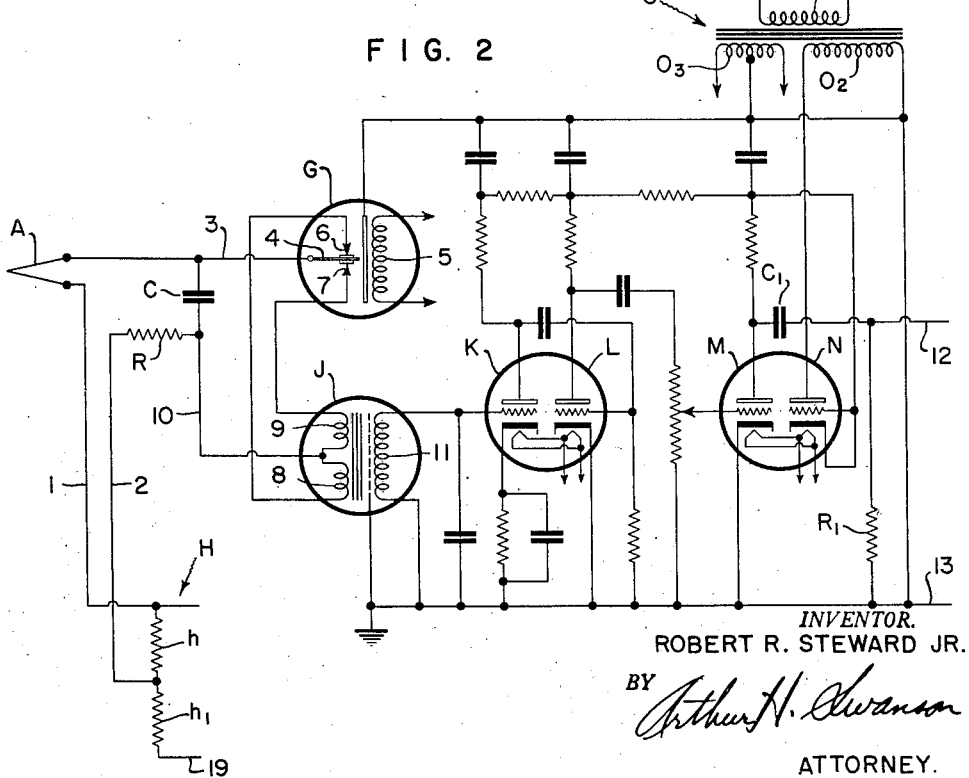
Fig. 2 is a diagram illustrating details of the input chopper arrangement shown more generically in Fig. 1.

The embodiment of the invention shown diagrammatically by way of illustration and example in Fig. 1, comprises a source of D. C. voltage shown as a thermocouple A and having terminal conductors 1, 2 and 3 through which a differential of the thermocouple voltage and a D. C. feedback voltage is impressed on a converter-amplifier element B of the general type shown in the above mentioned Wills patent. The element B is uesd to convert the D. C. signal from the source A into an A. C. signal and to amplify said A. C. signal. The converter portion of the element B is of the chopper type. The chopper type converter and electronic amplifying valves included in the element B are illustrated in Fig. 2 and are hereinafter described. The alternating current passing away from the element B is modified in an R. C. network CA to establish the desired phase relationship on the output thereof and to make its wave form approximate a sine wave. The voltage output is then impressed on the control grid of an electronic amplifier valve D. The latter is energized by a D. C. supply source E. The valve D may well be one of the valves of a twin valve of the commercial 12AU7 type.

The element F, shown in Fig. 1, diagrammatically indicates an output inverter of chopper type for use in converting alternating current into direct current which is fed back to the voltage source A. In practice, the element F may well be the commercial device known as a Western Electric "276–E relay." The element F includes an operating coil $f$ which vibrates a chopper blade $fa$. A phase shifting network G connects the operating coil $f$ to an alternating current supply source $g$ and shifts the phase of the current in the operating inductor coil $f$ approximately 90° with respect to the voltage of the source $g$. The impedance of the network G and the source $g$ are preferably selected so as not to unduly load the output of the valve D. Likewise, the impedance of valve D is selected so as not to load the source $g$.

The chopper blade $fa$ is vibrated by the operating coil $f$ between, and alternately engages, stationary contacts P and $P_1$ at opposite sides of the vibrating end of the blade $fa$. The contacts $P$ and $P_1$ are connected to the opposite ends of the stationary winding, $t_1$, $t_2$, of a transformer T.

The primary winding $t$ of the transformer T is connected to a source of alternating current, corresponding in frequency and phase, to the alternating current supplied by the current source $g$. A direct current circuit H is connected by conductors 18 and 19, respectively, to the stationary end of the vibrating blade $fa$, and to the midpoint of the secondary winding $t_1$, $t_2$ of the transformer T. The terminal conductor 1 of the thermocouple A is connected to one point of the circuit H, and a conductor 2 connects another point of the circuit H to the element B through a resistor R. As shown, the conductors 1 and 2 are directly connected to one another by a resistor $h$ forming a part of the circuit H. The terminal 3 of the thermocouple A is shown as directly connected to the input of the converter amplifier B, and as connected by a condenser C to the terminal 2. It is thought that the foregoing brief description of the apparatus shown in Fig. 1 may facilitate a general understanding of the invention, which is hereinafter described in more detail.

The character of the converter and amplifying valve mechanism, included in the element B and illustrated in Fig. 2, are next described. As diagrammatically shown in Fig. 2, the terminal 3 of the thermocouple A is directly connected to the stationary end of a vibratory blade or reed 4 having one end stationary and having its other end free to vibrate, and forming a part of a vibratory mechanism G. The blade 4 is caused to vibrate by an associated alternating current coil 5. The blade 4 moves back and forth with a frequency depending on the frequency of the current flowing through the coil 5 and engages a contact 6 at the end of each vibratory movement of the free end of the blade 4 in one direction, and engages a contact 7 at the end of each vibratory movement in the opposite direction. The contact 6 is connected to the outer end of a coil 8 included in the transformer structure J. The contact 7 is connected to the outer end of a coil 9 also included in the transformer structure J. The adjacent ends of the coils 8 and 9 are connected to one another and to a conductor 10. The latter is connected through the resistor R to the conductor 2. As shown, the conductors 1 and 2 are connected to each other by a resistor $h$ forming a part of the previously mentioned circuit H.

The coils 8 and 9 collectively form the primary winding of a transformer having a secondary winding 11. In the normal and intended operation of the apparatus shown in Fig. 2, the vibrator blade 4 operates through the contacts 6 and 7 and the connections of the latter to the outer ends of the coils 8 and 9 to create direct current pulsations alternately in the coils 8 and 9. Consequently, the coils 8 and 9 operate to produce an alternating current flow through the secondary winding 11 of the transformer unit, which has a frequency determined by the frequency of the alternating current passing through the coil 5, and the phase which reverses with reversals in polarity of the input D. C. signal. The frequency on winding 11 should be the same as that on transformer T and source $g$. The transformer secondary winding 11 has one terminal connected to a grounding conductor 13 and is also connected to elements of the associated electronic amplifier valve elements K, L and M and the associated rectifying element N.

The valve elements K and L are enclosed in one tube or vacuum chamber, and the valve M and rectifier N are enclosed in a second tube or vacuum chamber. The coil 5 and the heating filaments in the tube sections K, L, M and N are advantageously energized by the secondary winding $O_3$ of a transformer O having a primary winding $O_1$ and a secondary winding $O_2$. As shown, the winding $O_2$ also supplies the current rectified by the rectifier element N.

Further description of the apparatus shown in Fig. 2 will be found in the above mentioned Wills patent.

The amplifier shown in Fig. 2 has two output conductors 12 and 13. As shown in Fig. 1, the output terminal 12 is connected in series with a coupling condenser $C_1$, a resistor $R_2$ and a resistor $R_3$, to the control grid of the electronic valve D. The second output terminal 13 of the amplifier B has its end remote from said amplifier connected to ground. The terminal 13 is connected to the terminal 12 by a resistor $R_1$ and condensers $C_2$ and $C_3$. The resistor $R_1$ is connected to the terminal conductor 12 at a point between the condenser $C_1$ and the resistor $R_2$. The condenser $C_2$ is connected to the portion of the conductor 12 between the resistors $R_2$ and $R_3$, and the condenser $C_3$ is connected to the portion of the terminal conductor 12 between the resistor $R_3$ and the control grid of the valve D. The foregoing elements $C_1$, $R_1$, $R_2$, $C_2$, $R_3$ and $C_3$ are included in the previously mentioned phase shifting and signal modifying network CA. The anode of the valve D is connected through a resistor $R_4$ to a D. C. supply source E. The cathode of the valve D is connected to ground through a resistor $R_5$, the latter having a condenser $C_4$ in shunt therewith.

The operating coil $f$ of the output inverter or chopper F, has one end connected to ground and has its other end connected through a conductor portion 15, condenser $C_5$ and resistor $R_6$ to the previously mentioned alternating current source $g$ of the phase shifting network G. The anode of the valve D is connected by a condenser 14 to the conductor portion 15. The outer end terminal 16 of the previously mentioned secondary coil section $t_1$ is connected in series by a resistor $R_7$, a resistor $R_8$ and a condenser $C_6$ to a conductor 18. The second end terminal 17 of the secondary coil $t_2$ is connected to the conductor 18 by resistors $R'_7$ and $R'_8$ and a condenser $C'_6$. The conductor 18 connects the pivoted end of the vibrating blade $fa$ to one end of a load in the form of a meter or indicator 20. The latter has its other end connected to the thermocouple terminal 1. The previously mentioned circuit H comprises a resistor $R_{10}$ connecting the terminal conductor 1 to the center tap conductor 19 which has one end connected to the connected ends of the coils $t_1$ and $t_2$. The previously mentioned resistor $h$ which is connected between the thermocouple conductors 1 and 2, is connected in series with a resistor $h_1$ to form a resistor portion of the circuit H which is in parallel with the resistor $R_{10}$. A condenser $C_{20}$ serves as a stray signal grounding means.

As will be apparent to those skilled in the art, the load current may be utilized by passing through the meter 20, a relay, or a solenoid element connected in series with the output.

Figs. 3, 3a, 3b and 3c are intended to facilitate a ready understanding of the manner in which the output chopper $fa$ produces unidirectional current flows in the output circuit H. As will be apparent, there are two sources of current for energizing the operating coil $f$ of the output chopper mechanism. The primary source is the alternating current supply $g$, and the second source is the alternating current output of the valve D. As a result of the connection of the network G to the operating coil $f$, the operating current through the coil $f$ from the line circuit is displaced approximately 90° with respect to the line current. With a zero input signal to the chopper and voltage amplifier B shown in Fig. 1, the output from the valve D will also be zero. When an error signal of given polarity is applied to the input of the ampliger B, there will be produced an alternating voltage which is applied to the operating coil $f$ by the valve D which will be of a phase dependent upon the polarity of the input signal. In practice, the network CA is so selected and constituted that the alternating signal applied to the coil $f$ by the valve D approximates a sine wave and is displaced in phase approximately 90° with respect to the voltage of the alternating current source $g$.

The purpose of the transformer T with its single primary winding $t$ and its center tapped secondary winding $t_1$—$t_2$ is to provide a power source for the output of the apparatus. That power source together with the selective energization of the vibrating blade $fa$ by the operating coil $f$, is effective to produce in the output circuit H a unidirectional current of one polarity or of the opposite polarity in accordance with the phase of the alternating current supplied to the operating coil $f$ by the valve D.

As previously indicated, when the output of the valve D is zero, the energizing current through the operating coil $f$ from the source $g$ will be displaced 90° with respect to the voltage in the center tapped secondary winding $t_1$—$t_2$ of the transformer T. This condition is illustrated in Fig. 3 where the sinusoidal curves 21 and 22 of Fig. 3 respectively represent the voltage in the output winding of the transformer T, and the voltage in the operating coil $f$. In Fig. 3, the horizontal line 23 represents the common zero line for the curves 21 and 22. The vertical lines 24, 25 and 26 of Fig. 3 represent the switching points of the blade $fa$ with respect to the operational coil current curve 22 for one full cycle of that curve with the points occurring at the zero points of curve 22 along the line 23.

Thus the curves 21 and 22 of Fig. 3 indicate that when the current in the operating coil $f$ is zero and the 90° phase difference is maintained between the curves 21 and 22, the voltage in each of the upper and lower halves of the center tapped secondary winding will be at its maximum value. On the assumption that the operating current has just passed through its zero value and is increasing in the positive direction and the vibrating blade $fa$ is then moved into engagement with its associated upper contact P, the upper half, $t_1$, of the center tapped transformer secondary winding will be connected to the output circuit H so that a current will flow through a path that may be traced from the upper end of the secondary winding $t_1$ through the conductor 16, the upper contact P engaged by the blade $fa$, the meter 20, the circuit H and the conductor 19 back to the center tap on the winding. This circuit will be maintained so long as current flows in the same direction through the operating coil $f$ of the output chopper. As shown in Fig. 3, the last described circuit is maintained while the voltage in the upper half of the center tapped secondary winding $t_1$ decreases from a maximum value to zero, and then reverses in direction and builds up until it attains a maximum value in the reversed direction. At that point the current through the operating coil $f$ reverses and effects the movement of the blade $fa$ into engagement with the lower contact $P_1$ of the output chopper. The engagement of the blade with the lower contact connects to the output circuit H, the lower half $t_2$ of the center tapped transformer secondary winding. With this connection occurring at this interval of time, the potential at the lower end of the transformer secondary winding will be the same as the potential existing on the upper end of the secondary winding at the time the switch blade $fa$ moved into engagement with the upper contact P. Consequently, the movement of the switch blade $fa$ into engagement with the lower contact $P_1$ establishes a circuit between the lower half $t_2$ of the secondary winding and the network H through which a current wave of exactly the same shape flows as was produced when the switch blade $fa$ was moved into engagement with the upper contact P. This is illustrated graphically by the current wave sections $a$ and $b$ of Fig. 3. It will be noted that the areas, I and II subtended by the current wave sections $a$ and $b$ are identical, and there is then no resultant unidirectional current in either direction through the output circuit H. The condenser $C_7$ connected to the output terminals of the output chopper is adapted to filter out the pulsations in the waves $a$ and $b$, leaving zero output voltage applied to the network H. The voltage vector diagram for this condition is represented by Fig. 3$a$ which shows only an in phase component of signal RV.

When an error signal is applied to the amplifier B, an alternating voltage which is leading or lagging the voltage from source $g$ by approximately 90° will be applied to the operating coil $f$ by the valve D. The superimposition of the current from the valve D on the line current supplied to the coil $f$, effectively shifts the phase of the switch action of the vibrating blade $fa$ with respect to the voltage from transformer T. In consequence, the current waves produced in the output of the output chopper are made to assume, for example, the shape illustrated by current waves $a'$ and $b'$ of Fig. 3. It should be noted that the areas I in each of the last mentioned waves are smaller than the areas II. Because of the difference in these areas, there is a resultant unidirectional current flow in one direction through the network H. The current flowing through resistor $h$ of the network H produces a voltage drop which is in opposition to the voltage on the input produced by the thermocouple A. In other words, there is produced across the resistor $h$ a negative feedback or balancing voltage on the input of the amplifier B to make the complete circuit a self-balancing circuit. Fig. 3$b$ represents the vector diagram showing the signal relationship in obtaining curves $a'$ and $b'$. Here, VD represents the lagging component of signal and $RV_2$ the in phase component. The vector $rv_2$ is the resultant.

If the alternating current supplied to the operating coil $f$ by the valve D is reversed in phase, the output currents from the output chopper will have the wave forms shown by curves $a''$ and $b''$ in which the areas I subtended by each of the curves is larger than the areas II. For this condition, the unidirectional current obtained from the output chopper will flow in the opposite direction through the network H. Fig. 3$c$ represents the vector showing of the relationship of the signals where the vector VD is leading the vector RV by 90° and $rv_1$ represents the resultant signal.

As will be readily recognized, the instrument illustrated in Fig. 1 may be modified in various ways, and by way of illustration and example, different modifications of the invention are shown in each of the drawings Figs. 4, 5, 6, 7, and 7$a$. In Fig. 4, the voltage transmitted by the terminal conductors 1, 2 and 3 to the converter-amplifier B, is developed by current flow through a resistor $R_{15}$ from an unillustrated D. C. voltage source having terminals 3$a$ and 1$a$. The converter-amplifier B may be similar to the element B of Fig. 1 and may have output terminals 12 and 13 like the terminals 12 and 13 of Fig. 1. A circuit network CB generally like the circuit network CA of Fig. 1, modifies and shifts the phase of the output signal of the amplifier B so that the signal $i_a$ between the network CB and an inductor coil $ff$ will be a sine wave approximation which is 90° out of phase with the current $i_b$, the latter being between the coil $ff$ and a network CC.

The network CB which is connected between the element B and the driving coil $ff$, is operatively arranged to vibrate an output chopper blade $fa$ between alternately engaged contacts P and $P_1$. The vibrating blade $fa$ and associated stationary contacts P and $P_1$ of Fig. 4, may be similar to the parts $fa$, P and $P_1$ of Fig. 1. As shown, however, the contact P of Fig. 4 is directly connected to the upper end of a coil $t_1$, while the contact $P_1$ is directly connected to the lower end of a coil $t_2$. The adjacent ends of the coils $t_1$ and $t_2$ are directly connected as in Fig. 1, and collectively form the secondary winding of a transformer T. The terminals of the primary winding $t$ of the transformer winding T are connected to line voltage conductors 12$a$ and 13$a$. The line voltage conductor 12$a$ is shown as connected to the upper end of the coil $ff$ through the network CC. The line voltage conductor 13$a$ is shown as a direct extension of the grounded conductor 13. The network CC includes a resistor and a condenser and operates to shift the phase of the reference voltage applied by the conductors 12a and 13a so that the current $i_b$ will drive the output chopper blade $fa$ 90° out of phase with the voltage between the conductors 12a and 13a.

The vibrator $fa$ of Fig. 4 is connected to the conductor 1 through a load resistor $R_9$, and the connected ends of the secondary winding sections $t_1$ and $t_2$ are connected by the conductor 19 to the resistors $h$ and $h_1$. The terminal conductor 2 has one end connected to the connected ends of the resistors $h$ and $h_1$. The D. C. feedback circuit including the resistors $h$ and $h_1$ of Fig. 4 includes no resistor similar to the resistor H of Fig. 1, but the general operation of the means for feeding back a D. C. signal to the input terminals of the amplifier B shown in Fig. 4 is the same as that shown in Fig. 1.

Fig. 5 illustrates a modification of the apparatus shown in Figs. 1 and 4 in which the D. C. current source impressing an input voltage on an amplifier B is a bridge circuit U. The latter includes a temperature sensitive arm $U_1$ which may be a hot-wire resistor. Opposed bridge output junction terminal points $U_2$ and $U_3$ impress a D. C. voltage to be measured on the input terminals of the converter-amplifier B of Fig. 5. Conductors $U_4$ and $U_5$ connect the other two corners or junction points of the bridge U across a condenser $C_7$. The terminals of the latter may be connected to the output terminals of the apparatus on the output of the converter-amplifier element B in a manner generally similar to that in which the conductors 12 and 13 and the ends of the condenser $C_7$ are connected to the element B as shown in Fig. 1 or in Fig. 4.

The load element 20 of Fig. 1 and resistor $R_9$ of Fig. 4 are replaced in Fig. 5 by a wattmeter $U_6$, shown as directly connected between the terminal $U_4$ and the adjacent terminal of the condenser $C_7$. The meter $U_6$ also has a terminal $U_7$ connected across the conductors $U_4$ and $U_5$ in parallel with the condenser $C_7$ of Fig. 5. Current flow through the sensitive bridge arm $U_1$ will heat the arm and it will assume a predetermined resistance value.

With a particular predetermined temperature, the bridge will be near balance with the magnitude of unbalance being just sufficient for the output current fed back to the bridge U to supply heat lost by the resistor $U_1$ so that it will stay at said predetermined temperature. If the resistor $U_1$ is exposed to a moving fluid stream, the heat will be conducted away from the resistor at a greater rate and the bridge U will become more unbalanced. The resultant unbalance will cause a larger current to flow in the output of the apparatus through the wattmeter $U_6$ to the bridge. This current will heat the resistor U, until the bridge approaches balance. The reading of the wattmeter $U_6$ will give an indication of the velocity of fluid flow around the resistor $U_1$.

Fig. 6 illustrates a form of the invention differing from the forms illustrated by Figs. 1, 4 and 5 in respect to the manner in which the output voltage is utilized. One of the two signal conductors 2 and 3 connected to an input terminal of the converter-amplifier B of Fig. 6 includes a measuring circuit V. As shown, the circuit V is connected in the conductor 3. The apparatus collectively designated W in Fig. 6 is interposed between the output conductors 12 and 13 of the element B and the conductors 18 and 19, and includes such apparatus elements as those designated CA, E, F, G, $g$, $f$, T, P, $P_1$ and $fa$ in Fig. 1, and the similar or analogous portions of the apparatus shown in Fig. 4.

The portions of the conductors 18 and 19 shown in Fig. 6 are connected by a resistor 20 and an indicating meter 21. The conductor 18 includes a relay coil 22 and a rectifier 23 in shunt with said coil. The conductor 18 terminates in a wiper contact 24 adjustable along a slide wire resistor 25. The latter forms part of a D. C. circuit 26. One terminal of the resistor 25 is directly connected to the conductor 19, and the other terminal of the resistor 25 is connected to the conductor 19 through a source 27 of direct current. The circuit 26 maintains a bucking voltage in the circuit including the conductors 18 and 19, and the adjustment of the contact 24 along the resistor 25 effects a setpoint adjustment of the bucking voltage. When the voltage $E_0$ between the portions of the conductors 18 and 19 at the left of the resistor $R_{20}$, shown in Fig. 6, is less than the voltage $E_{sp}$ between the portions of the conductors 18 and 19 at the opposite side of the resistor 20 and coil 22, current will flow through the relay 22 and thus actuate the relay mechanism 30. When the voltage $E_0$ equals the voltage $E_{sp}$, there will be no relay current and the relay will not be operated. When the voltage $E_0$ exceeds the voltage $E_{sp}$, current will flow through the rectifier 23 but there will be no significant current flow through the coil 22 and no operation of the relay 30.

With the arrangement shown in Fig. 6, the output current is proportional to the input signal so that the meter 21 may be calibrated to provide a measure of the D. C. signal impressed on the input terminals of the element B. The relay 30 may be used to produce a regulator action, such for example, as the regulation of the temperature of a furnace including a thermocouple which impresses the error signal on the amplifier element B. The relay 22 and rectifier 23 may be replaced by a polarized relay to provide three-position control.

Fig. 7 illustrates a modification of the invention including elements B and W which may be identical with the Fig. 6 elements B and W, respectively. In Fig. 7, however, the output terminals 18 and 19 of the element W are connected by a circuit portion including a rectifier 23a and a saturable reactor control coil 31 in series with the rectifier. The rectifier 23a is arranged to pass current only when the potential of the conductor 18 exceeds the potential of the conductor 19. Current flow through the saturable reactor 31 may be used to effect any desired regulator action.

In Fig. 7, the D. C. voltage $e_7$ impressed on the element B by the input terminals 2 and 3 may be adjusted by means of a bridge X interposed between sections 3 and 3a of one of the input terminals through which a signal voltage is impressed on the element B. As shown, the bridge X comprises a source of direct current 35 in series with a resistor 36. The series connected bridge elements 35 and 36 pass current through two branches including series connected resistors 37 and 38, and 39 and 40. More or less of the resistor 40 may be short-circuited by adjustment of a slider contact 41.

In Fig. 7, the symbol $e_5$ represents the voltage between the input terminals 2 and 3a. The symbol $e_6$ represents the voltage between the connected ends of the resistors 37 and 38 and the connected ends of the resistors 39 and 40, i. e., between the input signal sections 3a and 3. In Fig. 7, $e_7$ represents the voltage between the conductors 2 and 3. Normally the voltage $e_6$ is of such polarity as to buck the voltage $e_5$, and the voltage $e_5$ exceeds the voltage $e_6$ by an amount equal to the voltage $e_7$. When the voltage $e_5$ is less than the voltage $e_6$, the polarity of the voltage $e_7$ will be such that the amplified output of the element B will phase shaft the output chopper included in the element W so that the direction of the current output will flow through the rectifier 23a and the saturable reactor 31. When the voltage $e_6$ exceeds the voltage $e_5$, the phase shafting effect on the output chopper in the element W will result in current flow through the rectifier 23a and reactor 31. When the voltage $e_5$ equals the voltage $e_6$, there will be no current flow through the rectifier 23a and element 31. When the voltage $e_5$ exceeds the voltage $e_6$, the relative potentials of the conductors 18 and 19 will be reversed and there will be no current flow through the rectifier 23a or element 31.

It will be readily apparent that the bridge X may be added to any of the input circuits of the present type to supply a suppression signal as well as a convenient means for compensating for input signal variations.

Fig. 7a illustrates an embodiment of the invention which differs from the embodiment shown in Fig. 7 only in respect to a portion of the output circuit of the element W including the conductors 18 and 19. The conductors 18 and 19 of Fig. 7a are connected by a circuit portion including a rectifier 23a and a relay coil 31a. Current will pass or be prevented from passing through the winding of the relay 31a under conditions similar to those previously described as permitting and preventing current flow through the winding of the saturable reactor 31. When operating conditions are such as to permit current flow through the winding of the relay 31a, the relay contacts 42 and 43 will thereby be relatively adjusted to apply power to a load through conductors 44 and 45.

As will be apparent, a distinguishing characteristic of each of the various embodiments of the invention illustrated and described herein, is the conjoint use of a converter-amplifier unit to convert a small D. C. signal voltage into a larger alternating current output voltage of selective frequency but of variable phase and magnitude, a transformer operative to develop an alternating output current of said frequency and of substantially constant phase and magnitude, and an inverter energized by alternating current of said frequency and having a D. C. output of a magnitude dependent on the magnitude and phase of said alternating current output voltage. In all forms of the invention, there is no direct closed electrical loop which might otherwise produce circuit instability.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. An electrical apparatus comprising in combination, converter means for converting a unidirectional voltage into an alternating voltage of selected frequency, means for amplifying said alternating voltage, a vibrator element, a source of a second alternating voltage of said selected frequency, means including said vibrator element being connected to convert said second alternating voltage into a direct current signal during the vibration of the vibrator, and means including said amplifier being connected to modify the phase relation of said vibrator relative to the phase of alternation of said second alternating current.

2. Apparatus as specified in claim 1, including a vibrator driving coil operative when energized by alternating current to give vibratory movements of said selected frequency to said vibrator element, and means for energizing said coil to move said vibrator element alternately in opposite directions with said selected frequency, and comprising said two sources of alternating voltage which vary in phase relative to one another in accordance with the polarity of said unidirectional voltage.

3. Apparatus as specified in claim 1, in which said first named converter forms an energizing source of alternating current of said selected frequency, and in which the alternating voltage formed by said converter is of constant frequency but varies in phase as the magnitude of the unidirectional voltage is varied.

4. Apparatus as specified in claim 1, including an inductor operative when energized by alternating current to give vibratory movements to said vibrator element, and means for energizing said inductor to move said vibrator element alternately in opposite directions with said selected frequency, and comprising said second source of alternating voltage of said selected frequency connected to said inductor impressing on said inductor a voltage proportional to the alternating voltage first mentioned in frequency but displaced in phase therefrom.

5. Apparatus as specified in claim 1, comprising means including said vibrator element and said second source for developing a unidirectional voltage, and means for feeding the last mentioned voltage back to said converter means.

6. Apparatus as specified in claim 1, comprising a signal source circuit impressing said unidirectional voltage on said converter means, and means comprising said vibrator element and second source developing a unidirectional voltage which is fed back to said circuit.

7. An instrument as specified in claim 1, having a unidirectional output circuit including said vibrator element, a transformer having a secondary winding, a center tap connection to said secondary winding, and means including said vibrator element for producing a unidirectional signal from the signal on said secondary winding between said tap and the ends of said winding.

8. Apparatus as specified in claim 2, in which the variation in phase of the alternating voltage impressed on said coil varies in one direction or the opposite direction depending on the direction of displacement of phase of one of said sources of alternating voltage, and means connecting the direct current signal from said vibrator to the input of said amplifier in opposition to said unidirectional voltage.

9. Apparatus as specified in claim 7, including a signal source circuit which impresses a unidirectional voltage on said converter means, and in which said output circuit is connected to said signal source circuit to balance the unidirectional voltage from said signal source circuit.

10. Apparatus as specified in claim 7, including a temperature sensitive bridge circuit and conductors connected to opposed junctions of said bridge circuit for impressing a small unidirectional voltage on the input terminals of said converter means, and in which said unidirectional output circuit is connected to the other two junction points of said bridge circuit.

11. Apparatus as specified in claim 7, in which said output circuit includes a rectifier which permits current flow in said output circuit in one direction only.

12. Apparatus as specified in claim 7, in which said output circuit includes set-point adjusting means for varying the current flow in said output circuit.

13. Apparatus as specified in claim 1, comprising a bridge circuit including a source of unidirectional voltage and resistors connected in series with said last named voltage source, and including means for modifying the effective voltage of one of said resistors to thereby regulate the signal voltage transmitted to said converter means.

14. Apparatus as specified in claim 7, in which said unidirectional output circuit includes a saturable reactor, and a rectifier permitting current flow through said reactor in one direction only.

15. Apparatus as specified in claim 14, in which a rectifier is connected in series with said reactor.

16. Electrical apparatus comprising in combination, means for converting a small unidirectional voltage into an alternating voltage of selected frequency, means for amplifying said alternating voltage, an electronic valve having an anode, a control grid, a cathode, and means connecting said anode to a source of unidirectional voltage, means impressing said amplified alternating voltage on said control grid, an inductor, inductor energizing means comprising a source of alternating current of said selected frequency and an alternating current derived from said anode, a vibrator vibrated by said inductor, a transformer having a primary winding connected to a source of alternating current of said selected frequency, and a secondary winding having end terminals arranged for alternate engagement by said vibrator during each vibration and a unidirectional current output circuit connected between said vibrator and the midpoint of said secondary winding.

17. Electrical apparatus comprising in combination, means for converting a unidirectional voltage into an alternating voltage of predetermined frequency, means for amplifying said alternating voltage, an electronic valve having an anode, a cathode, a control grid, and means for connecting said anode to a source of direct current, resistor and condenser elements forming an R. C. network connected to and operative to modify the voltage output of said amplifying means, means for impressing said output on said control grid, an inductor, a phase shifting network connecting said inductor to a source of alternating current of the previously mentioned frequency, means to apply an alternating current signal derived from the anode of said valve on said inductor and thereby to modify the action of said phase shifting network on said inductor, a transformer having a primary winding connected to a source of alternating current of the previously mentioned frequency and having a secondary winding with end terminals, a vibrator oscillated by said inductor with a frequency proportional to the first mentioned frequency and adapted to alternatively engage said terminals to produce a unidirectional signal, and a unidirectional control circuit means including a conductor connected to said vibrator and a second conductor connected to the midpoint of said secondary winding having said unidirectional signal thereon.

18. An electrical apparatus comprising, converter means for converting a unidirectional voltage into an alternating voltage of selected frequency an alternating current amplifier having an input connected to said converter means and having an output, a vibrator converter having a phase sensitive driving coil connected to the output of said amplifier, a source of alternating current, and means including said converter for producing from said source a unidirectional signal which varies in magnitude with the phase of said amplifier output.

19. An electrical voltage to current transducer comprising, a direct current signal source, means for converting said direct current signal into an alternating current of a phase which is reversible with reversals in polarity of said signal source, an amplifier connected to said converting means, a second source of alternating current, and a vibrator-converter having a driving coil connected to be energized by said amplifier and by said second source of alternating current signal so that said vibrator will have a unidirectional output signal dependent upon the phase relation between said amplifier output and said second source of alternating current.

20. An electrical voltage to current transducer comprising, a direct current signal source, means for converting said direct current signal into an alternating current of a phase which is reversible with reversals in polarity of said signal source, an amplifier connected to said converting means, a second alternating current source, and a mechanical coupling link controlled by the output of said amplifier for producing a unidirectional signal from said second alternating current source independent of the output of said amplifier, said unidirectional signal being adapted for feedback to the input of said converting means.

References Cited in the file of this patent

UNITED STATES PATENTS

| | | |
|---|---|---|
| 2,423,540 | Wills | July 8, 1947 |
| 2,605,302 | Specht | July 29, 1952 |
| 2,638,811 | Williams | May 19, 1953 |
| 2,697,791 | Krantz | Dec. 21, 1954 |